United States Patent
Hwang (10) Patent No.: US 8,102,149 B2
(45) Date of Patent: Jan. 24, 2012

(54) CHARGER CAPABLE OF PERFORMING INTEGRATED CONTROL AND SEPARATE CONTROL OF PARALLEL OPERATIONS

(75) Inventor: Ho Chul Hwang, Goyang-si (KR)

(73) Assignee: Signet System Inc. (KR)

( * ) Notice: Subject to any disclaimer, the term of this patent is extended or adjusted under 35 U.S.C. 154(b) by 621 days.

(21) Appl. No.: 12/255,596

(22) Filed: Oct. 21, 2008

(65) Prior Publication Data

US 2009/0160407 A1    Jun. 25, 2009

(30) Foreign Application Priority Data

Dec. 24, 2007  (KR) ................. 10-2007-0136421

(51) Int. Cl.
   *H02J 7/00* (2006.01)
(52) U.S. Cl. .................. 320/119; 320/116; 307/66
(58) Field of Classification Search .............. 320/119
   See application file for complete search history.

(56) References Cited

U.S. PATENT DOCUMENTS

| | | | |
|---|---|---|---|
| 7,135,836 B2 * | 11/2006 | Kutkut et al. .............. 320/116 |
| 7,501,720 B2 * | 3/2009 | Popescu-Stanesti et al. ... 307/66 |
| 7,554,292 B2 * | 6/2009 | Veselic ..................... 320/116 |
| 7,633,269 B2 * | 12/2009 | Chou et al. ................ 320/162 |
| 2007/0188138 A1 * | 8/2007 | Kobayashi ................. 320/119 |
| 2007/0188141 A1 * | 8/2007 | Hamaguchi et al. ......... 320/128 |
| 2010/0231167 A1 * | 9/2010 | Ohnuki .................... 320/119 |

FOREIGN PATENT DOCUMENTS

KR    1020010046659    1/2001

* cited by examiner

*Primary Examiner* — Melissa Koval
*Assistant Examiner* — Benjamin M Baldridge
(74) *Attorney, Agent, or Firm* — Cantor Colburn LLP

(57) ABSTRACT

The present invention relates to a charger capable of performing the integrated control and separate control of parallel operations. The charger includes a plurality of charging modules connected in parallel with each other. Each of the charging modules includes a rectification unit for converting input AC power into DC power. The system also includes a power conversion unit, a switching control unit, a DC unit, a detection unit, and a computation control unit. The computation control unit receives the voltage and current, detected by and fed back from the detection unit, computes the voltage and the current, and transmits a control signal required to allow the DC unit to supply a primary constant current, a constant voltage, and a secondary constant current to a battery.

4 Claims, 10 Drawing Sheets

CHARGER CAPABLE OF PERFORMING INTEGRATED CONTROL AND SEPARATE CONTROL OF PARALLEL OPERATIONS

BACKGROUND OF THE INVENTION

1. Field of the Invention

The present invention relates, in general, to a charger in which a plurality of charging modules, each capable of independently and performing a complete charging operation, is connected in parallel, and which can charge a battery without being limited by the capacity of the battery, and, more particularly, to a charger capable of performing the integrated control and separate control of parallel operations, which can simultaneously operate all charging modules without performing signal transmission between respective charging modules, thus eliminating the risk of overcharging or insufficient charging that may occur when a plurality of charging modules is connected in parallel in order to charge a battery.

2. Description of the Related Art

Generally, since a charger is set according to the capacity of a battery to be charged, it is impossible to charge batteries having other capacities using the set charger. Therefore, companies for manufacturing chargers must produce various types of chargers for respective battery capacities. In particular, since large-capacity chargers having a current of more than several hundreds of Amperes are expensive pieces of equipment at prices of even several million Won, they are problematic in that there is a large burden of stored goods, and it is difficult to meet the time for payment due to the difficulty of the manufacture, and in that the entire expensive charger must be replaced when a failure occurs in such a charger, so that a loss caused by the replacement is large, and thus it is difficult for medium and small-sized enterprises to attempt to manufacture such an expensive charger.

Therefore, there is a need to solve the above problems by providing a charger in which charging modules, each capable of independently performing a complete charging function as a single independent charger, are connected in parallel, and which can be used without being limited by the capacity of a battery (that is, may be used as a large-capacity charger).

However, when several charging modules are connected in parallel, it is difficult to simultaneously operate the charging modules as in the case of a single charger, thus resulting in several problems. The reason for this will be described below.

Figure 1A:
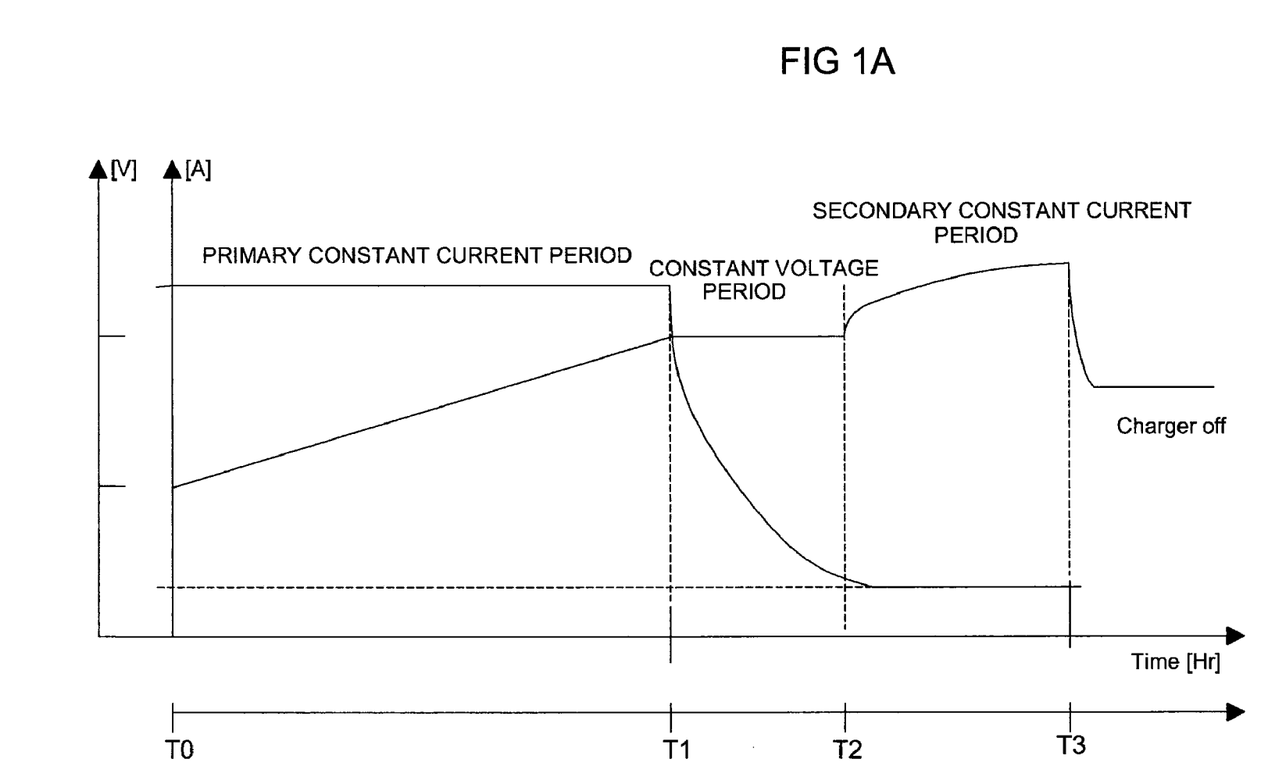
FIG. 1A is a diagram showing the typical charging profile of a charger for charging a lead-acid battery.

FIG. 1A is a diagram showing the typical charging profile of a charger for charging a lead-acid battery. The charger sequentially supplies charging power, corresponding to a primary constant current, a constant voltage and a secondary constant current, to the battery, thus charging the battery.

The constant current supplied during the primary constant current period $T_0 \sim T_1$ is set in a range of from 10 to 15% of the capacity of the battery. During this period, about 70 to 80% of the discharging amount of the battery is charged.

During a constant voltage period $T_1 \sim T_2$, when the charging level of the battery reaches a predetermined level (the start time point of the constant voltage period), the generation of gas from the battery is started, and thus current is reduced while the voltage is maintained at a constant value.

During a secondary constant current period $T_2 \sim T_3$, the constant current is set in a range of from 2 to 4% of the battery capacity. During this period, about 110% of the discharging amount of the battery is charged.

When several chargers (charging modules), each being a wholly independent charger having such a charging profile (a primary constant current, a constant voltage, and a secondary constant current) are connected in parallel, and then a large-capacity battery is intended to be charged, charging is not successfully performed as if a single charger had been operated, due to the following problems below.

A plurality of parallel-connected charging modules has constant voltages set to the same voltage in the constant voltage period, but has a certain error due to each individual charging module's own peculiar characteristics (for example: precision of detection of output voltage). That is, respective charging modules are different from each other in the start time point and end time point (start time point of the secondary constant current period) of the constant voltage period. In particular, the time point at which the secondary constant current period starts after the constant voltage period has been terminated is the time point at which a timer counts a time to terminate the charging operation of each charging module, and thus it is a very important point in time.

Figure 1B:
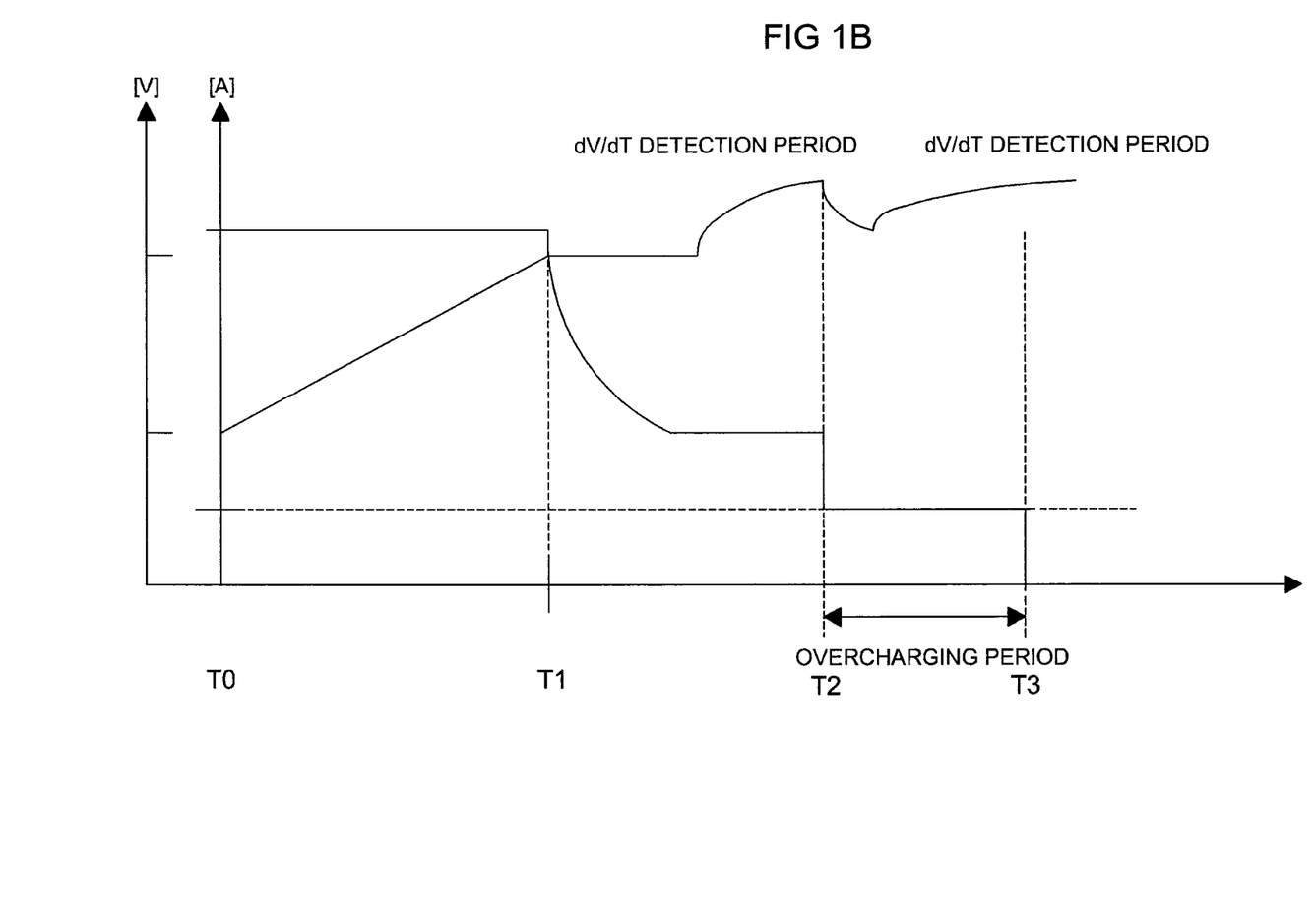
FIG. 1B is a diagram showing a problem occurring when a plurality of charging modules is connected in parallel to charge a battery.

In this way, when the time points at which respective charging modules reach the secondary constant current are different from each other due to the error of the constant voltage, the time points at which the charging operations of respective charging modules are completed are also different from each other. Furthermore, as shown in FIG. 1B, a specific charging module may enter the state in which variation in voltage $dV/dT$ is not detected due to the error in which an output voltage is not changed even if the charging level of the charging module has reached a secondary constant current (since charging modules are connected in parallel, the output voltages thereof are equal to each other), thus making it impossible to perform normal charging.

In addition, when, during the secondary constant current period, a specific charging module succeeds in detecting variation in voltage $dV/dT$, and then completes charging earlier than other charging modules, the current of the module, having completed the charging, is subtracted from the total current supplied to the battery, and thus the voltage of the battery rapidly decreases. As a result, other modules, which do not yet detect variation in voltage $dV/dT$, cannot detect correct variation in voltage $dV/dT$, and a procedure for detecting the voltage variation $dV/dT$ again from the time point at which the voltage decreases must be repeated, thus causing the risk of overcharging.

Further, the secondary constant current value is set in a recommended range for each manufacturing company in consideration of the internal characteristics and overcharging or insufficient charging characteristics of a battery. At this time, when a plurality of charging modules is connected in parallel, and the sum of currents, output from respective charging modules, becomes the charging current of the battery, a constant current supplied to the battery is less than a preset charging constant current when a failure occurs in some charging modules, thus increasing a charging time. When charging is compulsorily terminated using a timer, there is a problem in that the battery may be insufficiently charged due to such early termination of charging.

As described above, problems, occurring when the plurality of charging modules is connected in parallel to charge a battery, are compositely generated regardless of the sequence of the problems, so that there is a fear that overcharging and insufficient charging, negatively influencing the lifespan of a battery, are repeated. Further, since the charging operations of charging modules are not terminated at the same time, there is a probability that a user may confuse the completion of charging.

SUMMARY OF THE INVENTION

Accordingly, the present invention has been made keeping in mind the above problems occurring in the prior art, and an object of the present invention is to provide a charger capable of performing the integrated control and separate control of parallel operations, in which a plurality of charging modules, each functioning as a complete charger, is connected in parallel, thus charging a battery without being limited by the capacity of the battery (that is, a suitable number of charging modules are connected in parallel and operated in compliance with the capacity of a battery, or a suitable number of charging modules are selected from among a plurality of parallel-connected charging modules and are then operated), in which the parallel-connected charging modules are operated to simultaneously enter a secondary constant current period and terminate charging, as in the case of a single charging module, without requiring the transmission of specific signals between the charging modules, thus minimizing the risk of overcharging or insufficient charging, and in which, even if some charging modules cannot perform a charging function, the remaining charging modules compensate for current, thus performing charging.

In order to accomplish the above object, the present invention provides a charger capable of performing integrated control and separate control of parallel operations, comprising a plurality of charging modules connected in parallel with each other, each charging module comprising a rectification unit for converting input AC power into DC power; a power conversion unit for dropping the power input through the rectification unit by switching the power; a switching control unit for controlling a switching operation of the power conversion unit; a DC unit for converting the switched power, input through the power conversion unit, into DC power, and supplying the DC power to a battery; a detection unit for detecting an output voltage and an output current of the DC unit; and a computation control unit for receiving the voltage and current, detected by and fed back from the detection unit, computing the voltage and the current, and transmitting a control signal required to allow the DC unit to sequentially supply a primary constant current, a constant voltage, and a secondary constant current to a battery.

Preferably, the computation control unit of each of the charging modules is connected to memory for storing various types of data, including the primary constant current, the constant voltage, and the secondary constant current, and a timer operated from a time at which the charging module enters a secondary constant current period. In order to minimize inconsistency occurring between time points at which the timers of the parallel-connected charging modules start operations due to a difference between an actual output voltage of the DC unit and the voltage detected by the detection unit, the memory of each of the charging modules stores a secondary constant current voltage greater than the stored constant voltage by a predetermined level, and the computation control unit operates the timer when the voltage transmitted through the detection unit reaches the secondary constant current voltage value.

Preferably, the memory of each of the charging modules stores a secondary constant current compensation reference value and a first set time, and the computation control unit computes a voltage rising rate for the voltage transmitted through the detection unit during a period ranging from a time point at which the timer starts an operation to the first set time, compares the computed voltage rising rate with the secondary constant current compensation reference value, and transmits results of comparison to the switching control unit, thus adjusting magnitude of the secondary constant current output from the DC unit.

Preferably, the memory of each of the charging modules stores a second set time and a third set time, and the computation control unit transmits a charging termination signal to the switching control unit when a condition selected from among (a) the voltage transmitted in real time through the detection unit is in a boosted state and time counted by the timer is equal to or greater than the second set time, (b) the voltage transmitted in real time through the detection unit is dropped, and a time point at which the voltage is dropped is equal to or greater than the second set time, and (c) the time counted by the timer is equal to or greater than the third set time, is satisfied.

Preferably, the charger further comprises a controller individually connected to the plurality of charging modules and configured to transmit manipulation signals from a user and to receive signals related to operating states of respective charging modules.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 2:
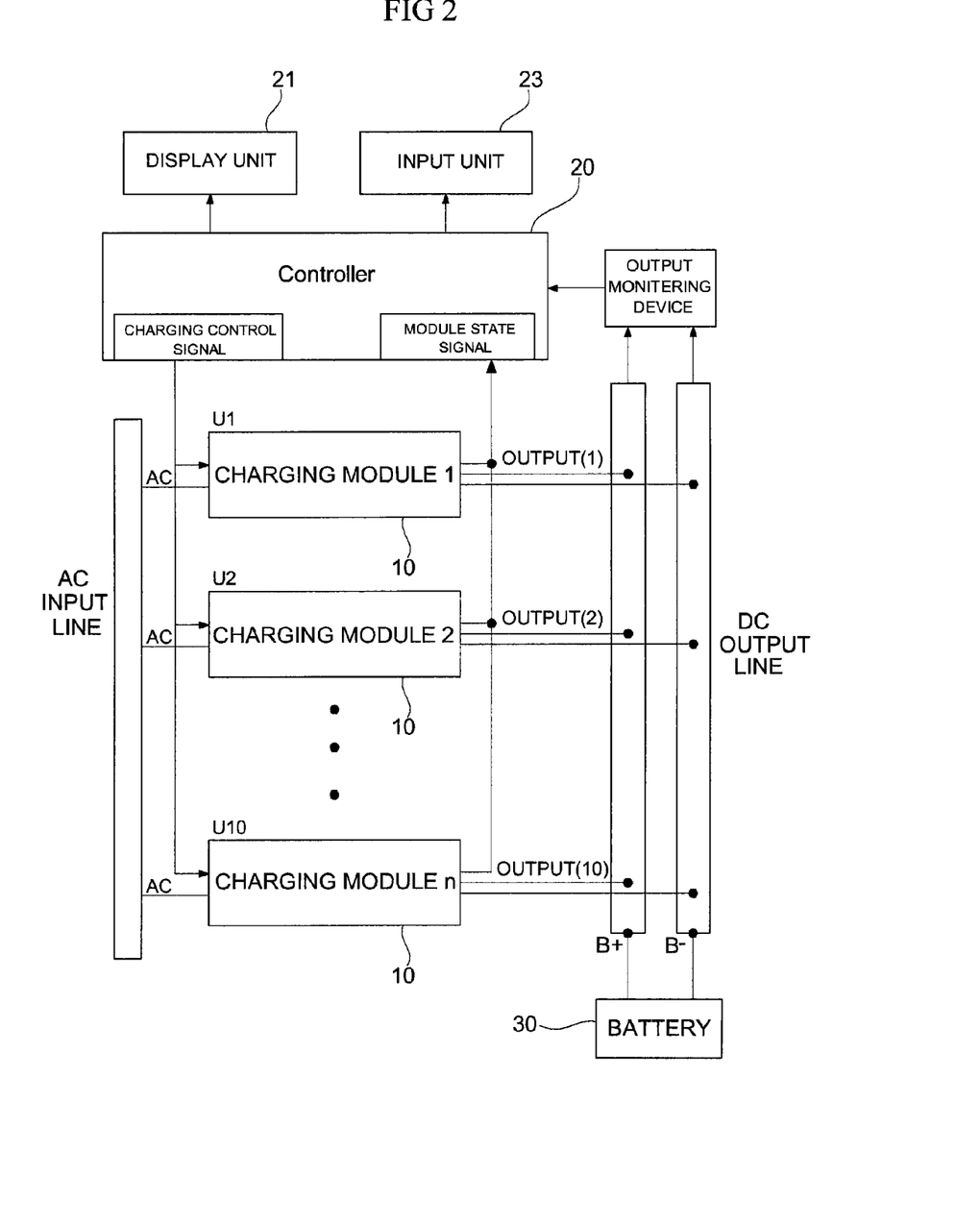
FIG. 2 is a diagram showing the entire construction of a charger according to the present invention.
Figure 3:
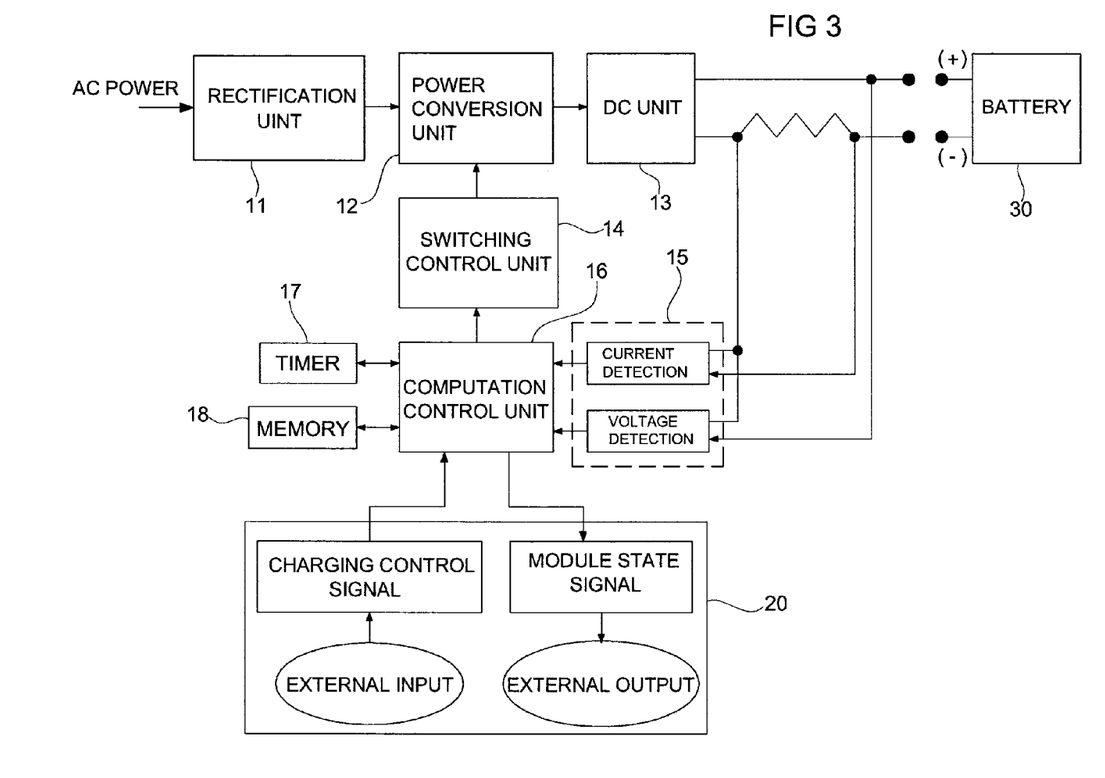
FIG. 3 is a diagram showing the construction of a charging module according to the present invention.

FIG. 2 is a diagram showing the entire construction of a charger in which a plurality of charging modules is connected in parallel according to the present invention, and FIG. 3 is a diagram showing the construction of each charging module.

As shown in FIG. 2, charging modules 10, each configured to charge a battery 30 by receiving commercial AC power, converting the AC power into a constant current or constant voltage having a certain magnitude, and outputting the constant current or voltage, are connected in parallel. The charging modules 10 are individually connected to a controller 20.

The controller 20 is provided to improve the convenience of a user, and includes an input unit 23 having a plurality of buttons required to input manipulation signals from the user, and a display unit 21 for displaying respective states, such as the state of manipulation by the user, the charging state of the battery 30, and the operating state of each charging module 10 so that the user can recognize the above states.

The user may give command signals, such as a charging start/end command and an emergency stop command, through the controller 20, or may set a primary constant current, a constant voltage, a secondary constant current, a secondary constant current voltage, a voltage rising rate, and first, second and third set times, which are set (stored) in each charging module. Further, the user can monitor the output voltage of each charging module 10 (that is, the voltage of the battery 30, the output current of each charging module 10, total current flowing into the battery 30, the occurrence of a failure in each charging module 10, the charging amount of the battery 30, etc.

As shown in FIG. 3, each charging module 10 includes a rectification unit 11, a power conversion unit 12, a DC unit 13, a switching control unit 14, a detection unit 15, a computation control unit 16, a timer 17, and memory 18.

The rectification unit 11 is composed of a diode, a coil, etc., and is configured to convert input AC power into DC power, eliminate noise from the DC power, and transmit the noise-eliminated DC power to the power conversion unit 12.

The power conversion unit 12 drops the input DC power into a voltage suitable for the charging of the battery 30 through Pulse Width Modulation (PWM) switching, and outputs the dropped voltage. Further, a high-voltage portion and a low-voltage portion of the power conversion unit 12 may preferably provide electrical insulation for reasons of electric safety.

The DC unit 13 is composed of a diode, a capacitor, a resistor, etc., and is configured to convert the power switched by the power conversion unit 12 into DC power, and eliminate noise from the DC power, and thus supply a constant current or constant voltage required for charging to the battery 30.

The switching control unit 14 controls the switching of the power conversion unit 12, thus enabling the DC unit 13 to output the constant current or the constant voltage.

The detection unit 15 detects the output power (output voltage and current) of the DC unit 13, and transmits the detected output power to the computation control unit 16.

The memory 18 stores various types of data required to charge the battery 30, and the timer 17 performs counting from the start time point of a secondary constant current period.

The computation control unit 16 computes values input from the detection unit 15, the memory 18, and the timer 17, and transmits a control signal to the switching control unit 14 on the basis of the results of computation so that the DC unit 13 sequentially supplies the primary constant current, the constant voltage, and the secondary constant current to the battery 30 depending on charging profiles.

Hereinafter, with reference to FIGS. 4A, 4B, 5A and 5B, to be described below is a method of, under the control of the computation control unit 16, minimizing inconsistency between the time points at which the charging modules 10 enter a secondary constant current period, suitably compensating for the constant current output from each charging module 10 so as to allow all secondary constant currents flowing into the battery 30 to approximate to a preset constant current, and allowing the charging modules 10 to terminate charging at almost the same time.

As described above, due to the peculiar characteristics of the charging modules 10, even if constant voltages stored in the memory 18 of respective charging modules are identical to each other, the time points at which the charging modules 10 enter and leave a constant voltage period, and then enter a secondary constant current period are different from each other (that is, time points at which respective timers 17 start operations are different). The difference between the time point at which the first charging module 10 enters a constant voltage period and the time point at which the last charging module 10 enters a constant voltage period may be a minimum of several tens of minutes to a maximum of several hours, thus causing several problems. Because of this problem, through a compulsive method, all charging modules 10 must enter the secondary constant current period at almost the same time point.

Figure 4A:
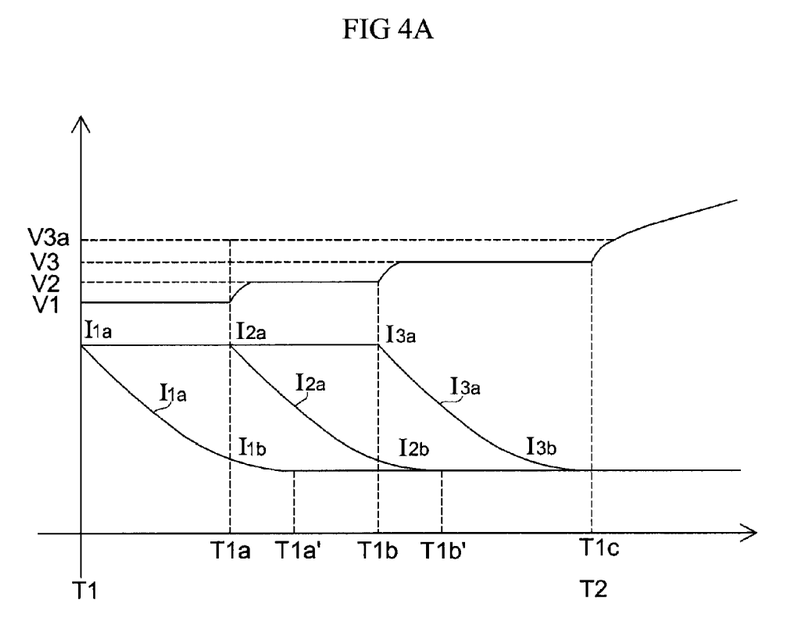
FIGS. 4A and 4B are diagrams showing methods of causing respective charging modules to simultaneously enter a secondary constant current period.
Figure 4B:
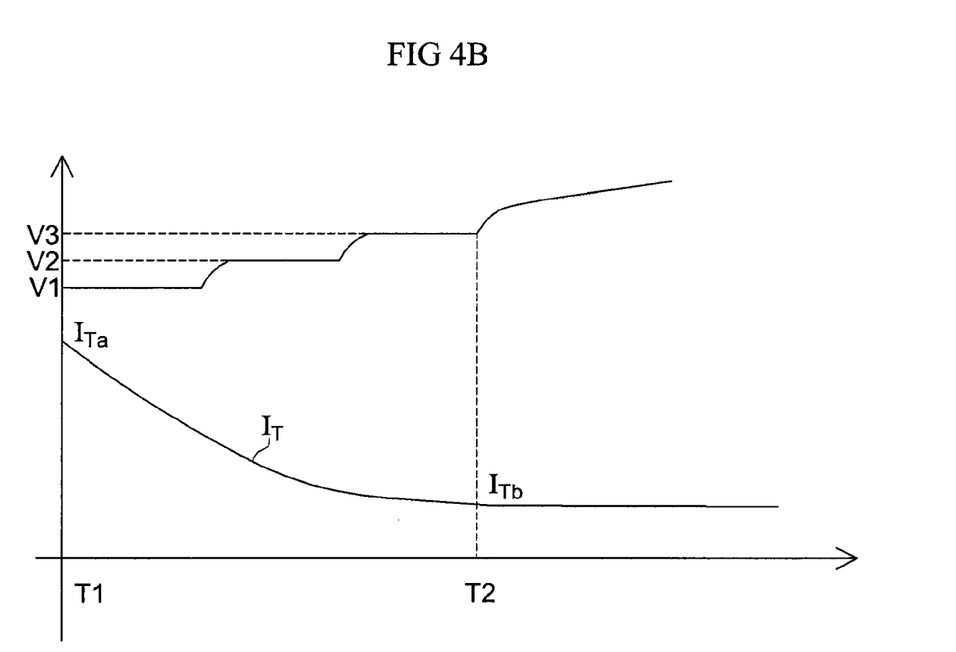

With reference to FIGS. 4A and 4B, this operation is described below. When a constant voltage stored in the memory 18 is assumed to be $V_2$, a certain charging module 10 exactly enters the constant voltage period at the time point at which the actual output voltage of the DC unit 13 reaches $V_2$, and then enters the secondary constant current period while output current $I_2$ gradually decreases and becomes constant.

Another charging module 10 enters a constant voltage period at the time point at which the actual output voltage of the DC unit 13 reaches $V_1$ less than $V_2$, or $V_3$ greater than $V_2$, and then enters a secondary constant current period earlier or later than the charging module 10 having the voltage $V_2$ while output current $I_1$ or $I_3$ gradually decreases and becomes constant.

When current is the basis in this way, respective charging modules 10 are greatly different from each other in the time points $T_{1a}$, $T_{1b}$, and $T_{1c}$ at which they enter the secondary constant current period, and thus the time points at which respective timers 17 of the charging modules 10 start operations in relation to the termination of charging also greatly differ from each other.

However, when the time points at which respective charging modules 10 enter the secondary constant current period are set on the basis of voltage (that is, the time points at which the timers 17 start operations), the charging modules 10 can be configured to enter the secondary constant current period (to start the operations of the timers 17) at almost the same time.

That is, generally, when the charging modules enter the secondary constant current period, the output currents of the charging modules 10 are constant, but the output voltages thereof rapidly increase. However, since the charging modules 10 are connected in parallel, the output voltages thereof cannot be rapidly increased until all charging modules 10 enter the secondary constant current period. As shown in FIG. 4A, the output voltage of the charging module having a voltage $V_1$, entering the secondary constant current period first, does not continuously increase after the output current $I_1$ becomes constant. The output voltage of the charging module having the voltage $V_1$ continuously increases after the constant voltage periods of the charging modules 10 having voltages $V_2$ and $V_3$, which enter secondly and thirdly the secondary constant current period, have been terminated (that is, after the time point $T_{1c}$ at which the constant voltage periods of all the charging modules 10 are terminated).

If a period during which the output current is constant, and the output voltage continuously increases in this way is assumed to be a constant current period, it can be considered that the charger, in which the charging modules 10 are connected in parallel, initiates a secondary constant current period at the time point $T_{1c}$ at which the constant voltage periods of all the charging modules 10 are terminated.

Therefore, in order to minimize inconsistency occurring between the time points at which parallel-connected charging modules 10 enter the secondary constant current period due to an error in constant voltage (that is, the difference between the actual output voltage of the DC unit 13 and the output voltage of the DC unit 13 detected by the detection unit 15) attributable to the peculiar characteristics of the charging modules 10, the present invention is configured such that a secondary constant current voltage $V_{3a}$ is stored in the memory 18 of respective charging modules 10 to allow the timers 17 of the charging modules 10 to be operated (to perform counting) at almost the same time, and such that each computation control unit 16 allows a corresponding timer 17 to perform counting when the output voltage transmitted through the detection unit 15 reaches the secondary constant current voltage $V_{3a}$.

Here, the secondary constant current voltage $V_{3a}$ is preferably set to a value slightly greater than the constant voltage value ($V_3$ in the drawings) having the maximum error that may occur due to the characteristics of the charging modules 10.

For reference, since an increase in voltage rapidly occurs after the charger (all of the charging modules 10) enters the secondary constant current period, the difference between the time points at which timers 17 start operations is negligible even if an error is present in the secondary constant current voltage $V_{3a}$ attributable to the characteristics of respective charging modules 10, as in the case of an error in the constant voltage.

In this way, when the secondary constant current voltage $V_{3a}$ is set, and then the timers 17 of the charging modules 10 are operated (the charging modules 10 compulsorily enter the secondary constant current period), it can be seen that a combined current $I_T$ of respective charging modules 10 has the same form as the current output from a single large-capacity charging module 10, as shown in FIG. 4B.

Since the charging modules 10 are connected in parallel, and currents output therefrom are supplied to the battery 30, currents flowing into the battery 30 are apt to deviate from a suitable value (an initially set value) and to overcharge or insufficiently charge the battery 30.

Therefore, there is a need to eliminate such a risk by compensating for (such as by adding or subtracting a current) the currents flowing into the battery 30 to comply with a suitable value.

Therefore, the present invention is configured such that both a secondary constant current compensation reference value and a first set time are stored in the memory 18 of each of the charging modules 10, and such that each computation control unit 16 computes a voltage rising rate from the voltage transmitted from the detection unit 15 during a period ranging from the time point at which the timer 17 starts an operation to the first set time, compares the computed voltage rising rate with the secondary current compensation reference value, and controls the switching control unit 14 on the basis of the results of comparison, thus compensating for current by adding or subtracting the current output from the DC unit 13.

This operation is described in detail with reference to FIGS. 5A and 5B (an enlarged view of part 'A' of FIG. 5A).

Figure 5A:
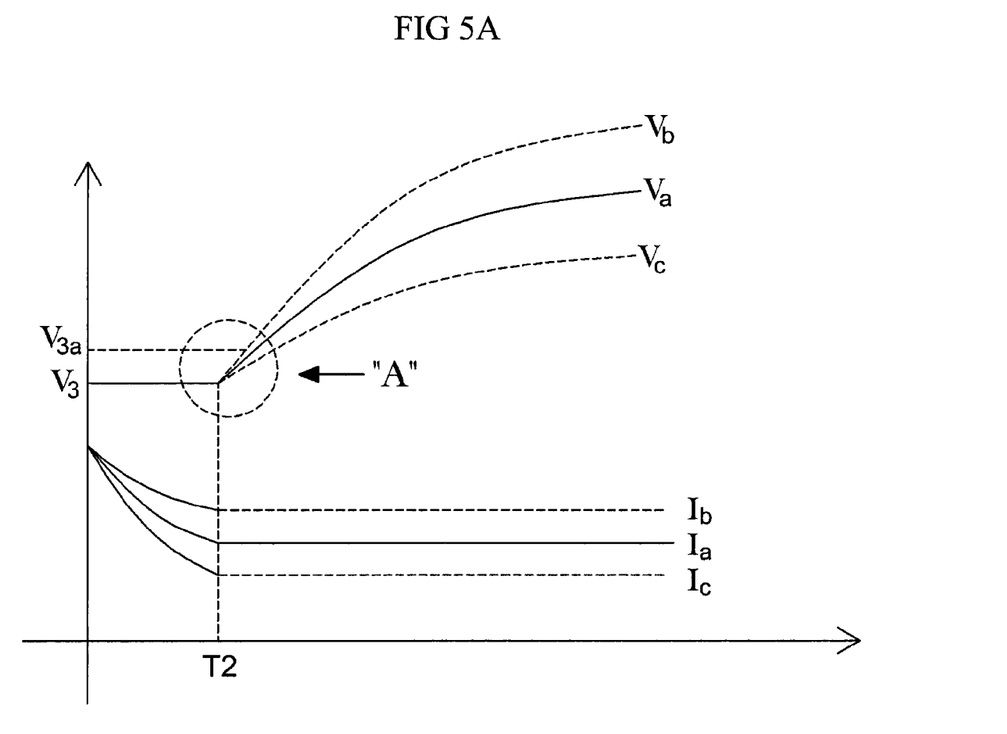
FIGS. 5A and 5B are diagrams showing methods of compensating for a constant current flowing into a battery during a secondary constant current period.

As shown in FIG. 5A, when the charger enters the secondary constant current period at a time point $T_2$, and supplies a suitable constant current $I_a$ to the battery 30, voltage at the battery 30 (that is, the output voltage of each charging module 10) increases in the form of $V_a$. When a constant current $I_c$ or $I_b$ less than or greater than the suitable constant current is supplied to the battery 30, voltage at the battery 30 increases in the form of $V_c$ or $V_b$.

During the secondary constant current period, when the output voltage of the charging module 10 has the form of $V_b$, the battery 30 has the risk of overcharging, whereas, when the output voltage has the form of $V_c$, the battery 30 runs the risk of requiring a long charging time or undergoing insufficient charging.

Figure 5B:
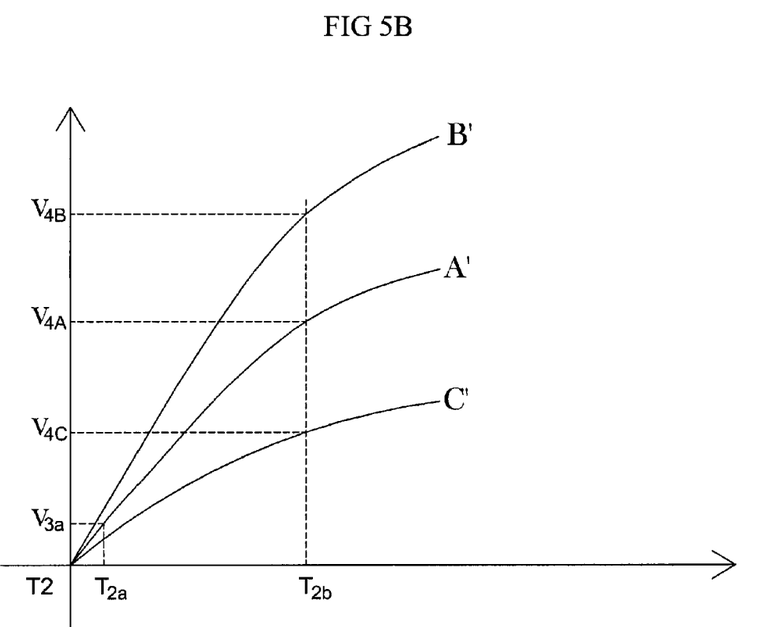

The charging voltage applied to the battery 30 is identical to the output voltage of each charging module 10, and all constant currents, flowing into the battery 30 during the initial interval of the secondary constant current period, have characteristics of being proportional to the rising rate of the charging voltage applied to the battery 30, as shown in FIG. 5B.

Accordingly, a voltage rising rate $dV_4/(T_{2b}-T_{2a})$ (where $dV_4$ is the difference between voltages at time points $T_{2b}$ and $T_{2a}$ appearing during a predetermined period (for example, 5 minutes) after the charger enters the secondary constant current period (that is, during a period ranging from the time point $T_{2a}$ at which the timer 17 starts an operation to the time point $T_{2b}$ five minutes after the time point $T_{2a}$) is computed using the voltages transmitted in real time through the timer 17 and the detection unit 15 of each charging module 10. When the computed voltage rising rate is less than the secondary constant current compensation reference value, the switching control unit 14 is controlled through the computation control unit 16, so that the current output from the DC unit 13 of each charging module 10 is increased. In contrast, when the computed value is greater than the secondary constant current compensation reference value, control is performed such that the output current is decreased. Accordingly, all constant current values flowing into the battery 30 can approximate to a suitable constant current.

After the charging of the battery 30 has been sufficiently performed, the parallel-connected charging modules 10 are allowed to simultaneously terminate charging (operation stop), thus preventing the lifespan of the charger from being shortened, eliminating unnecessary power consumption, and suitably charging the battery 30.

There are two conditions, which are generally provided and are to be met for the termination of the charging of the battery 30. The first condition is to terminate charging when variation in voltage dV/dT is detected (that is, the battery is present in the secondary constant current period), and the time counted by the timer 17 is equal to or greater than a reference time. The second condition is to unconditionally terminate charging when the time counted by the timer 17 is equal to or greater than the final time.

When the above two conditions are applied to the charger in which the charging modules 10 are connected in parallel, the conventional charger exhibits characteristics that the time points at which the timers 17 of the charging modules 10 start operations are different from each other, as described above, and thus the time points at which the charging operations of the charging modules 10 are terminated are also different from each other.

Meanwhile, in the present invention, when the above two conditions are applied after the time points at which the timers 17 of the charging modules 10 start operations are forced to be identical to each other, the final times of the timers 17 of the charging modules 10 are reached almost simultaneously. However, when any one of the charging modules 10 terminates charging, that charging module 10 does not output current, so that the voltage applied to the battery 30 (the output voltage of the charging modules 10 that do not yet terminate charging) is once dropped and is then boosted, as shown in FIG. 1B, and thus variation in voltage dV/dT is detected after a predetermined period of time has elapsed. As a result, the charging operations of respective charging modules 10 are not simultaneously terminated.

Therefore, the present invention is intended to add a single condition so that the charging modules 10 can simultaneously terminate charging operations.

That is, the computation control unit 16 detects whether the voltage, transmitted in real time through the detection unit 15, has dropped, and stores a second set time (charging termination reference time) and a third set time (charging termination final time) in the memory 18.

Accordingly, the computation control unit 16 terminates the charging of a relevant charging module 10 when one of the following conditions is satisfied: the time counted by the timer 17 of each charging module 10 is equal to or greater than the third set time; the voltage applied to the battery 30 is in a boosted state (detection of dV/dT), and the time counted by the timer 17 is equal to or greater than the second set time; and the voltage applied to the battery 30 (the output voltage of each charging module 10) is dropped and the time point at which the voltage is dropped is equal to or greater than the second set time.

In this way, when one of the three conditions is satisfied, charging is terminated. As a result, when any one charging module 10 normally terminates charging (that is, after the second set time has elapsed), voltage drop immediately occurs, thus allowing all charging modules 10 to simultaneously terminate charging.

Figure 6:
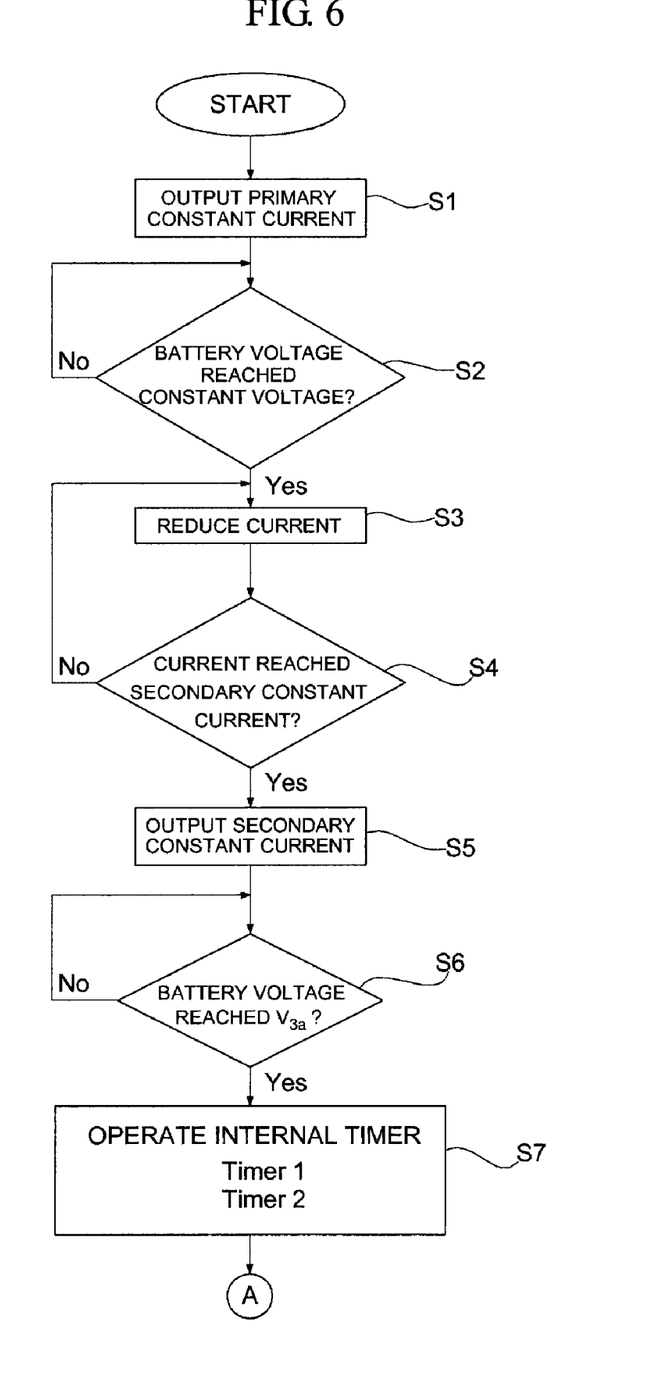
FIG. 6 is a flowchart schematically showing a process for charging a battery using the charger according to the present invention.

FIG. 6 is a flowchart showing a process for charging a battery using the charger of the present invention. A charging process will be described in brief with reference to FIG. 6.

First, when charging is started, each charging module 10 outputs a constant current corresponding to a set (stored) primary constant current value until the output voltage (the voltage of the battery 30) reaches the constant voltage stored in the memory 18 at steps S1 and S2.

When the output voltage reaches the constant voltage, the constant voltage is maintained until a gradually decreasing current reaches the secondary constant current stored in the memory 18 at steps S3 and S4.

When the current of each charging module 10 reaches the secondary constant current, that current is maintained at step S5. When the output voltages of all charging modules 10 reach the secondary constant current, and then the voltage of the battery 30 (the output voltage of the charging modules 10) reaches the secondary constant current voltage stored in the memory 18, the timer 17 of each charging module 10 is operated at steps S6 and S7.

Thereafter, when the timer 17 performs counting, and a counted time reaches the first set time at step S8, an output voltage rising rate $dV_4$, appearing during a period ranging from the time point at which the timer 17 starts counting to the time point at which the counted time reaches the first set time, is computed at step S9. The output voltage rising rate $dV_4$ is compared to the secondary constant current compensation reference value stored in the memory 18, and thus the secondary constant current is compensated for by adding or subtracting the output current of each charging module 10 so that the second constant current approximates to a suitable value at steps S10 and S11.

Further, when voltage variation (dV/dT) of the battery 30 is detected (that is, boosted state) or the voltage drop of the battery 30 is detected after a time counted by the timer 17 becomes equal to or greater than the second set time, or when the counted time is equal to or greater than the third set time, the charging of the relevant charging module 10 is terminated at steps S12 to S15. When the charging operation of any one of the charging modules 10 has been terminated, the charging operations of other charging modules 10 are successively terminated, and thus the charging of the battery 30 is completely terminated.

Although preferred embodiments of a charger capable of performing the integrated control and separate control of parallel operations, which has specific components and performs specific functions, have been described, those skilled in the art will appreciate that various modifications, additions and substitutions are possible, without departing from the scope and spirit of the invention as disclosed in the accompanying claims. It should be noted that such modifications, additions and substitutions will be included in the scope of the invention.

As described above, the present invention provides a charger, which is advantageous in that a plurality of charging modules can be connected in parallel in compliance with the capacity of a battery, and thus the charger can perform charging without being limited by the capacity of the battery, in that the parallel-connected charging modules can be simultaneously operated, like a single charging module, without requiring the transmission of signals between the charging modules, and in that, when a failure occurs in some charging modules, other charging modules can compensate for current, and thus the risk of overcharging or insufficient charging is reduced.

What is claimed is:

1. A charger capable of performing integrated control and separate control of parallel operations, comprising:
    a plurality of charging modules connected in parallel with each other, each charging module comprising:
    a rectification unit for converting input AC power into DC power;
    a power conversion unit for dropping the power input through the rectification unit by switching the power;
    a switching control unit for controlling a switching operation of the power conversion unit;
    a DC unit for converting the switched power, input through the power conversion unit, into DC power, and supplying the DC power to a battery;
    a detection unit for detecting an output voltage and an output current of the DC unit; and
    a computation control unit for receiving the voltage and current, detected by and fed back from the detection unit, computing the voltage and the current, and transmitting a control signal required to allow the DC unit to sequentially supply a primary constant current, a constant voltage, and a secondary constant current to a battery;
    wherein the computation control unit of each of the charging modules is connected to memory for storing various types of data, including the primary constant current, the constant voltage, and the secondary constant current, and a timer operated from a time at which the charging module enters a secondary constant current period; and in order to minimize inconsistency occurring between time points at which the timers of the parallel-connected charging modules start operations due to a difference between an actual output voltage of the DC unit and the voltage detected by the detection unit, the memory of each of the charging modules stores a secondary constant current voltage greater than the stored constant voltage by a predetermined level, and the commutation control unit operates the timer when the voltage transmitted through the detection unit reaches the secondary constant current voltage value, and
    wherein the memory of each of the charging modules stores a secondary constant current compensation reference value and a first set time; and the computation control unit computes a voltage rising rate for the voltage transmitted through the detection unit during a period ranging from a time point at which the timer starts an operation to the first set time, compares the computed voltage rising rate with the secondary constant current compensation reference value, and transmits results of comparison to the switching control unit, thus adjusting magnitude of the secondary constant current output from the DC unit.

2. The charger according to claim 1, wherein:
    the memory of each of the charging modules stores a second set time and a third set time; and the computation control unit transmits a charging termination signal to the switching control unit when a condition selected from among (a) the voltage transmitted in real time through the detection unit is in a boosted state and time counted by the timer is equal to or greater than the second set time, (b) the voltage transmitted in real time through the detection unit is dropped, and a time point at which the voltage is dropped is equal to or greater than the second set time, and (c) the time counted by the timer is equal to or greater than the third set time, is satisfied.

3. The charger according to claim 1, further comprising a controller individually connected to the plurality of charging modules and configured to transmit manipulation signals from a user and to receive signals related to operating states of respective charging modules.

4. The charger according to claim 2, further comprising a controller individually connected to the plurality of charging modules and configured to transmit manipulation signals from a user and to receive signals related to operating states of respective charging modules.

* * * * *